United States Patent [19]

Hansen et al.

[11] Patent Number: 5,428,946
[45] Date of Patent: Jul. 4, 1995

[54] ROW CROP CUTTER AND CONVEYOR

[76] Inventors: Elmer K. Hansen, deceased, late of Pahrump, Nev.; by Catherine Hansen, administrator and executor, P.O. Box 70244 Pahrump, Nev. 89041

[21] Appl. No.: 186,660

[22] Filed: Jan. 21, 1994

[51] Int. Cl.[6] .............................. A01D 45/16
[52] U.S. Cl. ....................... 56/27.5; 56/14.3; 56/14.5; 56/98
[58] Field of Search ............ 56/14.3, 14.5, 27.5, 56/94, 98, 503

[56] References Cited

U.S. PATENT DOCUMENTS

| | | | |
|---|---|---|---|
| 3,075,339 | 1/1963 | Barkstrom | 56/14.3 X |
| 3,079,744 | 3/1963 | Newswanger | 56/27.5 |
| 3,492,797 | 2/1970 | Sears | 56/14.3 X |
| 3,499,272 | 3/1970 | Looker | 56/14.3 X |
| 3,654,753 | 4/1972 | Gervals | 56/27.5 |
| 3,798,884 | 3/1974 | Middleton | 56/27.5 |
| 4,813,216 | 3/1989 | Day et al. | 56/27.5 |

*Primary Examiner*—George A. Suchfield
*Attorney, Agent, or Firm*—Brian J. Laurenzo; Kent A. Herink

[57] ABSTRACT

A harvesting apparatus for use with fragile row crops such as tobacco where the produce or leaves must be handled with great care to avoid breakage or bruising. The apparatus has a conveyor system and gathering chains which receive the tobacco from a cutter and engage the stalks and the leaves separately to convey the tobacco to a processing point. A specially designed dual conveyor system contacts the leaves on two sides to adequately support and transport the tobacco without damage.

15 Claims, 6 Drawing Sheets

ROW CROP CUTTER AND CONVEYOR

BACKGROUND OF THE INVENTION

This invention relates to a harvesting apparatus for row crops and, more particularly, to an apparatus for cutting and conveying tobacco in which the leaves of the tobacco are substantially undamaged during cutting and conveying of the tobacco.

Many row crops such as tobacco must be handled very delicately during harvesting to prevent damage to the leaves. Crops such as tobacco are typically cut by hand with a machete. The tobacco leaves are then often allowed to wilt in the sun for a day or so to reduce the amount of bruising and breaking of the tobacco leaves as the plant is handled. Once the plant has sufficiently wilted, the plants are speared with a stick and hung in a curing or drying barn. A major drawback of prior art tobacco harvesting methods is the large amount of labor and, therefore, cost associated with such methods. Even though methods of harvesting have been developed whereby workers ride along on a tractor and cut tobacco stalks as they go, each stalk must still be individually harvested by hand, making it virtually impossible to harvest the crop without a large number of low paid workers.

Although automated devices have been created for many row crops such as corn, soybeans, and oats, such machines are typically too abrasive for harvesting tender produce such as tobacco leaves. These devices, therefore, cannot be used in harvesting such crops. Reducing the labor involved in harvesting tobacco, while preventing damage to the leaves during harvest is, accordingly, desirable.

The difficulties in the prior art tobacco harvesting apparata are substantially eliminated by the present invention.

SUMMARY OF THE INVENTION

Accordingly, it is an object of the present invention to provide a row crop harvesting apparatus which automatically cuts and conveys a single row of crops.

It is another object of the present invention to provide a row crop harvesting apparatus for cutting and conveying row crops without damaging the produce attached thereto.

Still another object of the present invention is to provide a row crop harvesting apparatus which increases row crop harvesting efficiency.

These and other objects of the invention will become apparent upon reference to the following specification, drawings, and claims.

By the present invention, it is proposed to overcome the difficulties encountered heretofore. To this end, a harvesting apparatus for row crops having stalks and produce is provided. The apparatus is capable of cutting the stalks and conveying the row crops to a processing point without substantial damage to the produce. The apparatus comprises a frame having a front and a back, as well as a cutter connected near the front of the frame, the cutter which is capable of cutting the stalks of the row crops. At least one guide is connected near the front of the frame and in front of the cutter, the guide which is capable of directing the row crops into the cutter. Means are connected to the frame for receiving and conveying the produce to the processing point. Means are also connected to the frame for engaging the stalks separately from the produce and conveying the stalks to the processing point. The stalk engaging and conveying means are capable of conveying the stalks in a manner which substantially prevents contact of the stalk engaging and conveying means with the produce.

DETAILED DESCRIPTION OF THE INVENTION

While this invention is susceptible of embodiment in many different forms, there is shown in the drawings and will herein be described in detail, several specific embodiments with the understanding that the present disclosure is to be considered as an exemplification of the principals of the invention and is not intended to limit the invention to the embodiments illustrated.

Illustrated in the Figures, generally at 10, is a row crop cutting and conveying apparatus 10 particularly suited for the harvesting of tobacco 14. The apparatus is designed for cutting stalks 12 of the tobacco 14 and conveying the tobacco 14 substantially undamaged to a processing point 16.

Figure 1:
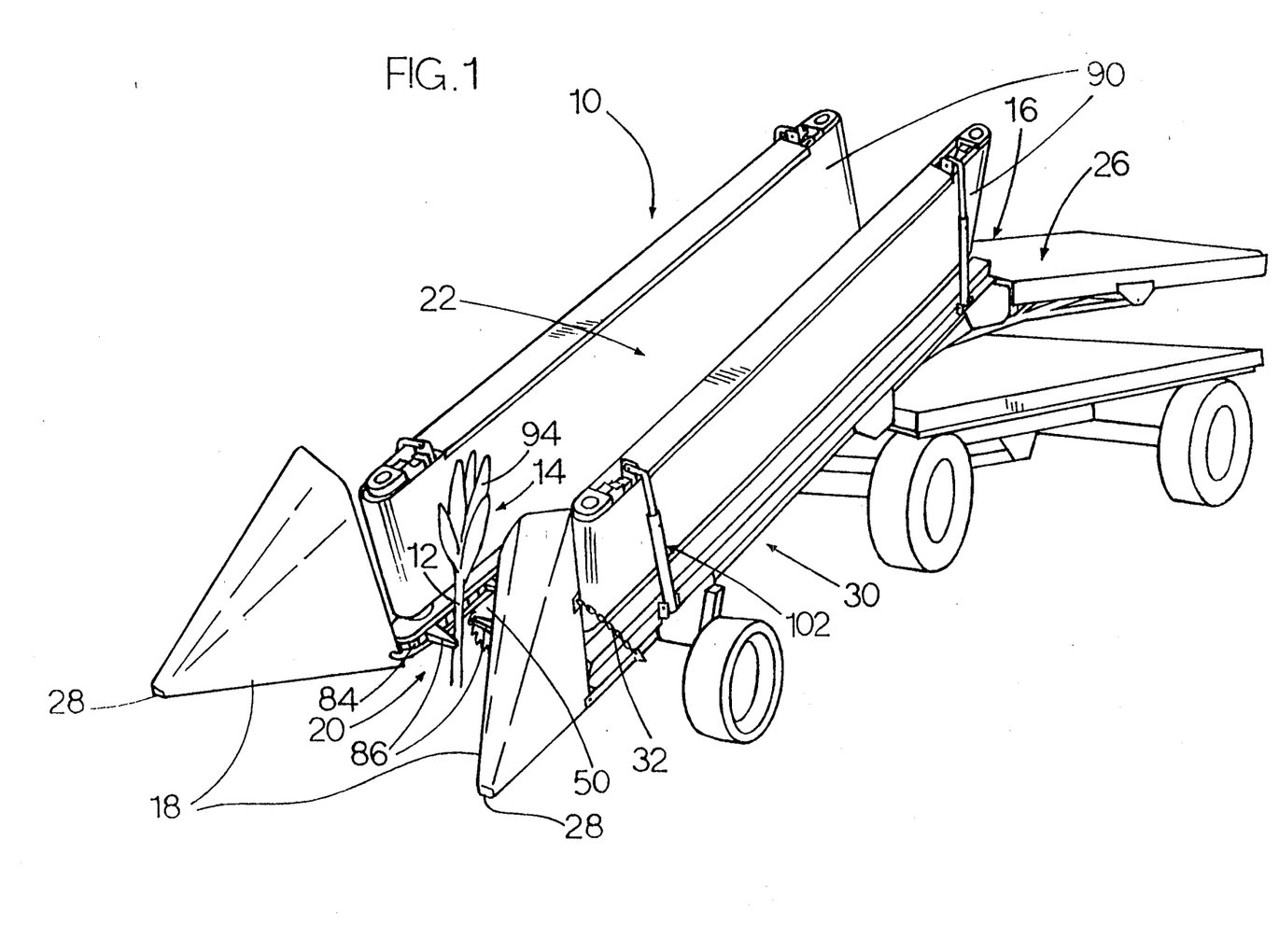
FIG. 1 is a perspective view of the tobacco cutter and conveyor of the present invention.
Figure 2:
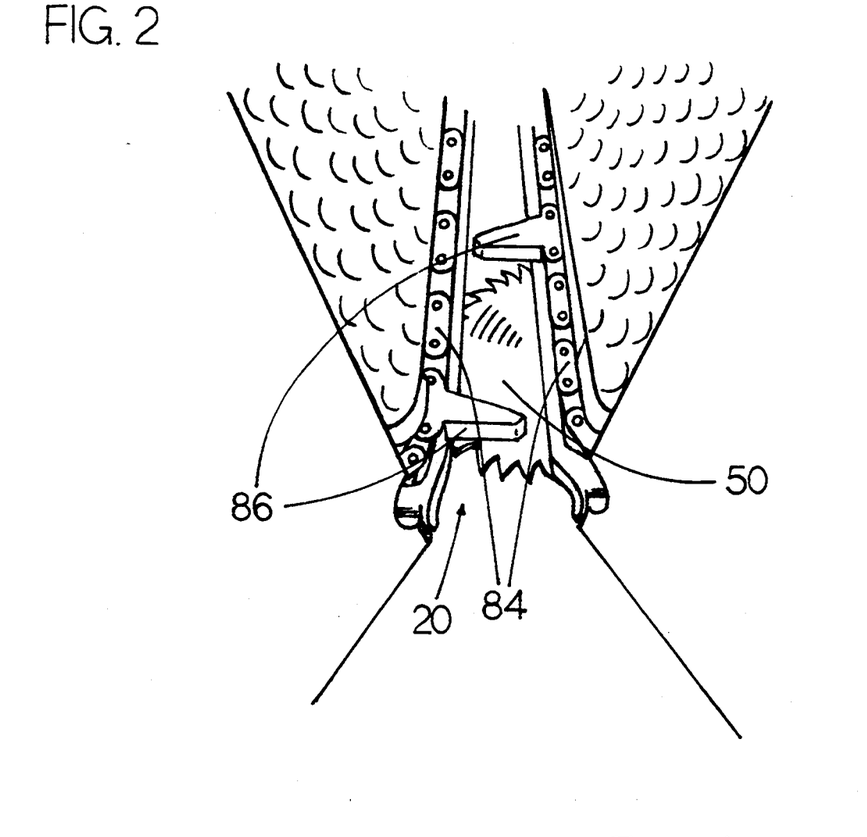
FIG. 2 is a perspective view of the cutting area and conveyor of the present invention.

As shown in detail in FIG. 1, the apparatus 10 has a pair of snouts 18 used to guide the tobacco 14 into a cutting area 20. From the cutting area 20 shown in FIG. 2, the tobacco 14 is transported by a dual conveyor 22 and a pair of gathering chains 84 to the processing point 16. Preferably, a horizontal conveyor 26 is positioned to receive the tobacco 14 coming off of the dual conveyor 22. The horizontal conveyor 26 transports the tobacco 14 to a wagon, or similar device, used to transport the tobacco 14.

Figure 6:
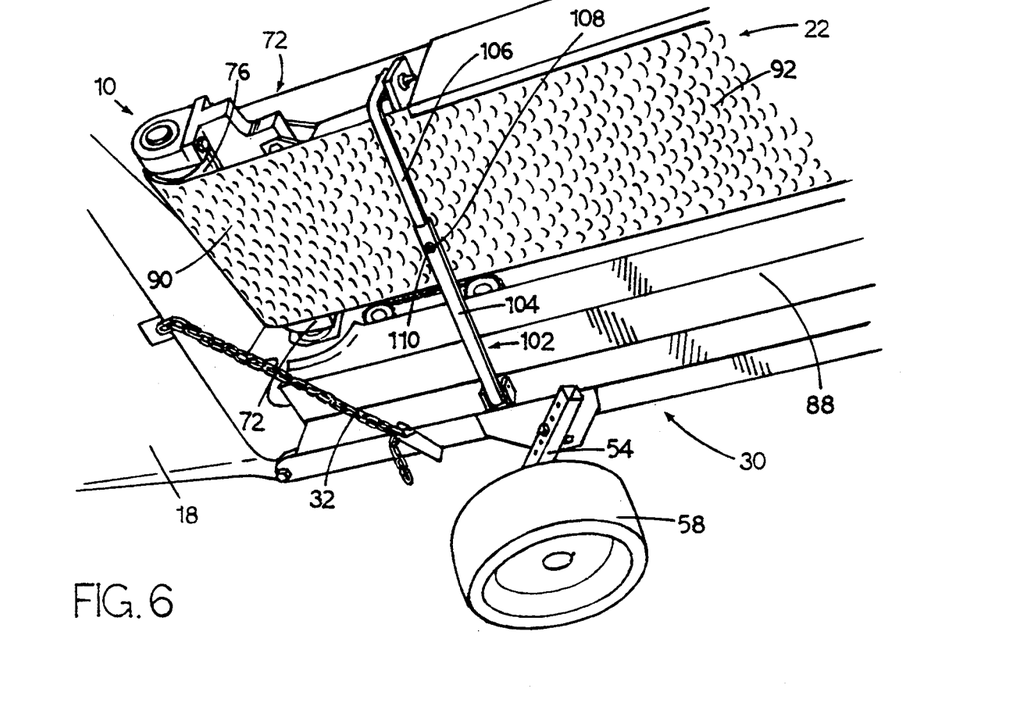
FIG. 6 is a perspective view of the conveyor pivoting means of the present invention.

The pair of snouts 18 are provided with ends 28 which are positioned approximately three feet apart from one another. The ends 28 may be positioned further apart or closer to one another depending upon the width of the rows of the tobacco 14 being harvested. The snouts 18 are hingably connected to a frame 30 and are also connected to the frame 30 by an adjustment chain 32, the length of which may be shortened or lengthened to increase or decrease the distance between the ends 28 of the snouts 18 (FIGS. 1 and 6). The snouts 18 are preferably constructed of sheet steel and are rounded on the tops and bottoms to prevent damaging any tobacco 14 which may contact the snouts 18.

Figure 3:
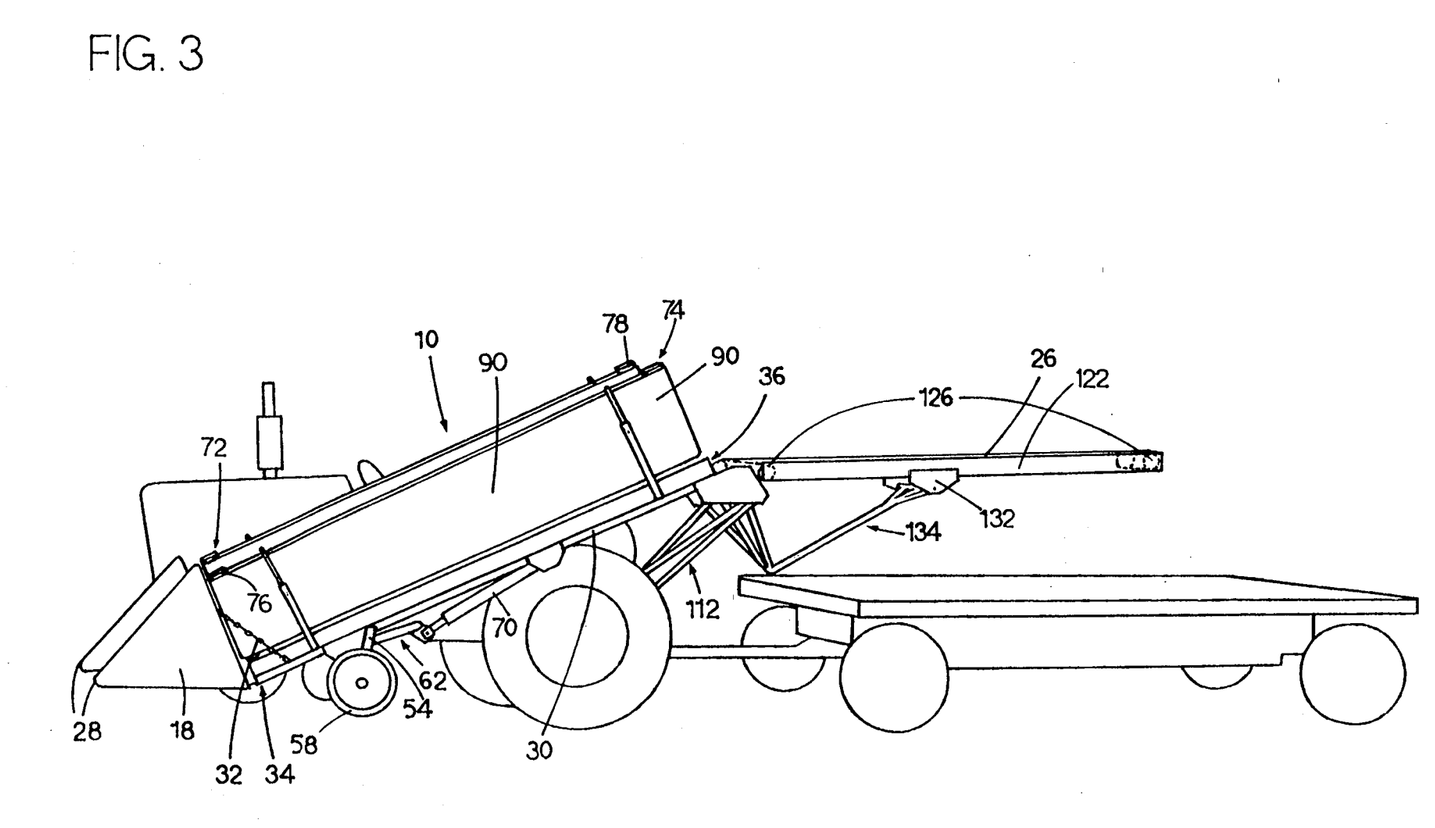
FIG. 3 is a side elevational view of the tobacco cutter and conveyor of the present invention connected to a tractor and trailer.
Figure 4:
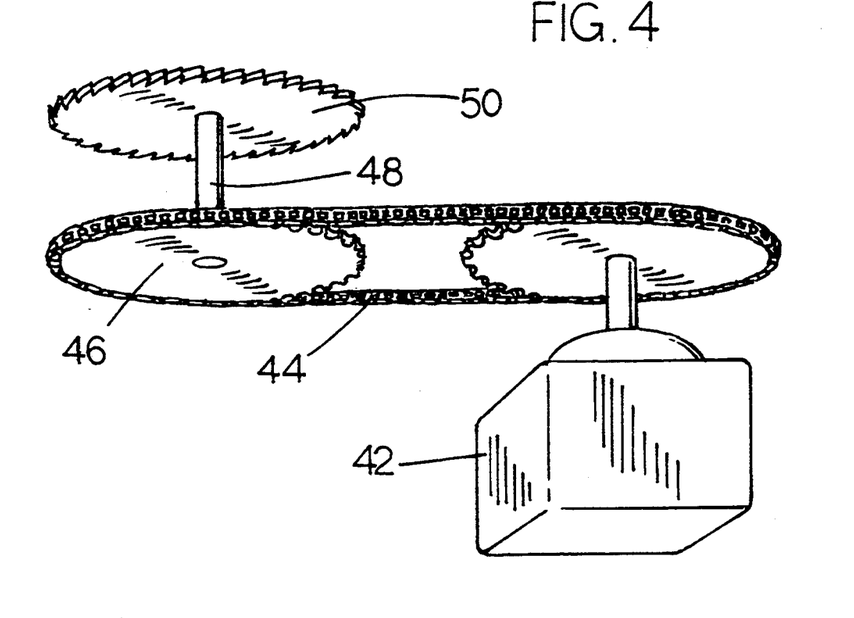
FIG. 4 is a perspective view of the saw mechanism of the present invention showing a hydraulic motor attached thereto.
Figure 5:
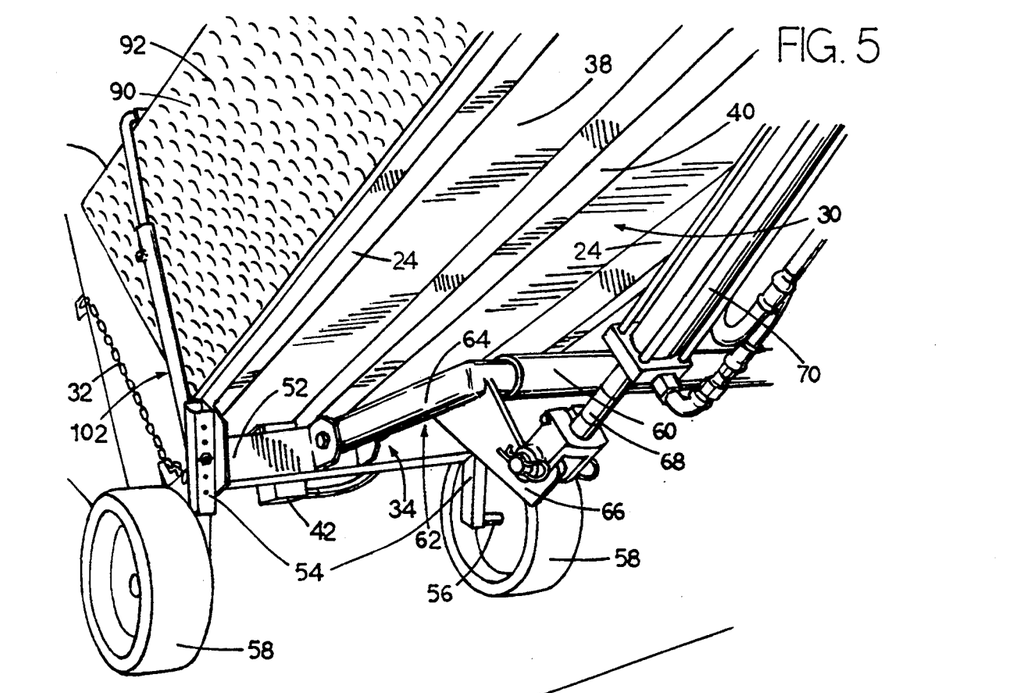
FIG. 5 is a perspective view of the lift mechanism of the present invention.

The frame 30 has a front end 34, a rear end 36 and two sides 24 (FIGS. 3 and 5). The frame 30 is constructed of a sheet of steel 38 and a rib 40 secured to and running the length of the underside of the frame 30 (FIG. 5). Affixed near the front 34 of the frame 30 is a hydraulic motor 42 connected by a chain 44 to a drive wheel 46 (FIGS. 4 and 5). The drive wheel 46 is connected by an axle 48 passing through the frame 30 to a circular steel saw 50 positioned near the front 34 of the frame 30.

A steel wheel support 52 is welded transversely across the frame 30 to the rib 40 and the sides 24 of the frame 30 (FIG. 5). Extending downward from the wheel support 52 are steel struts 54 connected to axles 56 which, in turn, are connected to wheels 58. A support sleeve 60 is operably connected to a tractor or similar pulling vehicle to support the apparatus 10. Pivotally connected to the support sleeve 60 is an L-shaped frame lifter 62. The frame lifter 62 fits within the support sleeve 60 for pivotal movement in relationship thereto. A forward arm 64 of the lifter 62 is at a fixed angle relative to a lower arm 66. The forward arm 64 is pivotally connected to the wheel support 52 by a pin and keeper or a similar pivotal connection means. The lower arm 66 is pivotally connected to a ram 68 of a hydraulic cylinder 70 which is pivotally connected to the frame 30.

Connected to the front 34 of the frame 30 are a pair of front roller assemblies 72 and connected to the rear of the frame 36 are a pair of rear roller assemblies 74 (FIG. 3). Front rollers 76 are provided for the front assembly 72 and rear rollers 78 are provided for the rear assembly 74. The rollers 76 and 78 are preferably plastic cylinders journaled to the assemblies 72 and 74 by axles 80 passing through and secured to the rollers 76 and 78 (FIG. 8).

Figure 8:
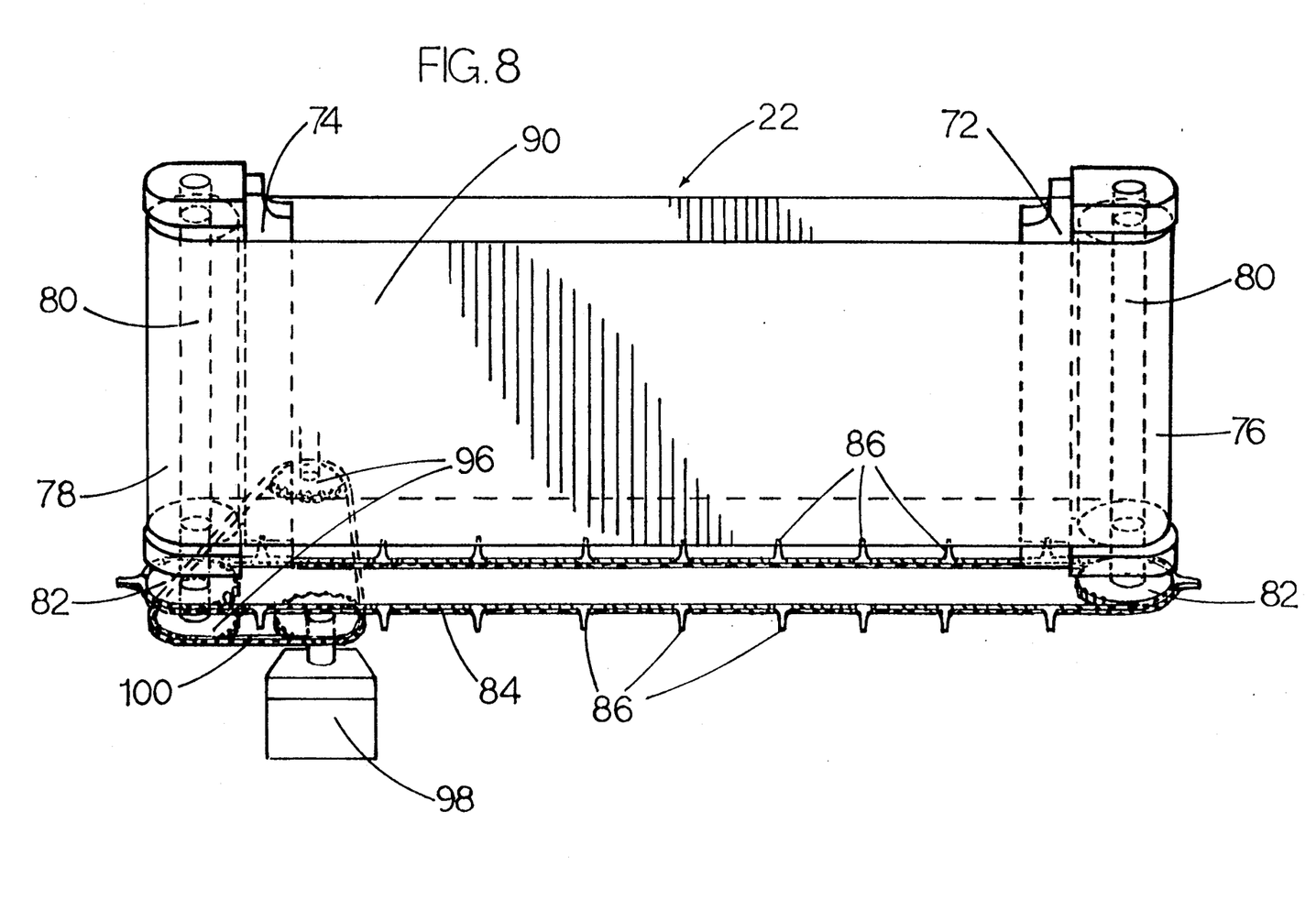
FIG. 8 is a perspective view of one of the dual conveyors in partial phantom.

The axles 80 extend below the assemblies 72 and 74 and are secured to sprockets 82 which engage the pair of gathering chains 84 (FIG. 8). The gathering chains 84 are provided with a plurality of fingers 86 to engage the tobacco 14 contacting the gathering chains 84 (FIG. 1). To protect the gathering chains 84 and to give the apparatus 10 an added aesthetic appeal, chain covers 88, formed from sheet steel, are welded to the frame 30 over the gathering chains 82 (FIGS. 6 and 8). Encircling the rollers 76 and 78 are conveyor belts 90 which are constructed of a continuous loop of material such as canvas or rubber. Preferably, the conveyor belts 90 are provided with an irregular rough surface 92 to aid in the handling of leaves 94 associated with the tobacco 14 (FIGS. 1 and 6). In addition to the sprockets 82, the rear rollers 78 are also secured to a pair of drive sprockets 96 positioned below the frame 30 (FIGS. 3 and 8). The drive sprockets 96 are connected to the rear rollers 78 by the axles 80 which pass through, and are journaled to, the frame 30. A hydraulic motor 98 is secured to the underside of the frame 30 and connected by means of a drive chain 100 to both of the drive sprockets 96.

Adjuster arms 102 are provided on the apparatus 10 to vary the angle between the dual conveyors 22 to accommodate various types of leaves 94 on various types of tobacco 14 (FIG. 1). The arms 102 are of a two-piece construction having a lower cylindrical sleeve 104 pivotally connected to the frame 30 (FIG. 6). Provided within the sleeve 104 and extending upward is an L-shaped support arm 106 pivotally connected to one of the front roller assemblies 72. Provided in the side of the sleeve 104 is a threaded hole 108 into which fits a set screw 110 to secure the support arm 106 from moving in relationship to the sleeve 104. By loosening the set screws 110 and adjusting the support arms 106 relative to the sleeves 104, the angle of the dual conveyors 22 may be varied in relationship to one another. Adjuster arms 102 are also provided on the rear of the apparatus 10 to adjust the rear of the dual conveyors 22 (FIG. 1).

Figure 7:
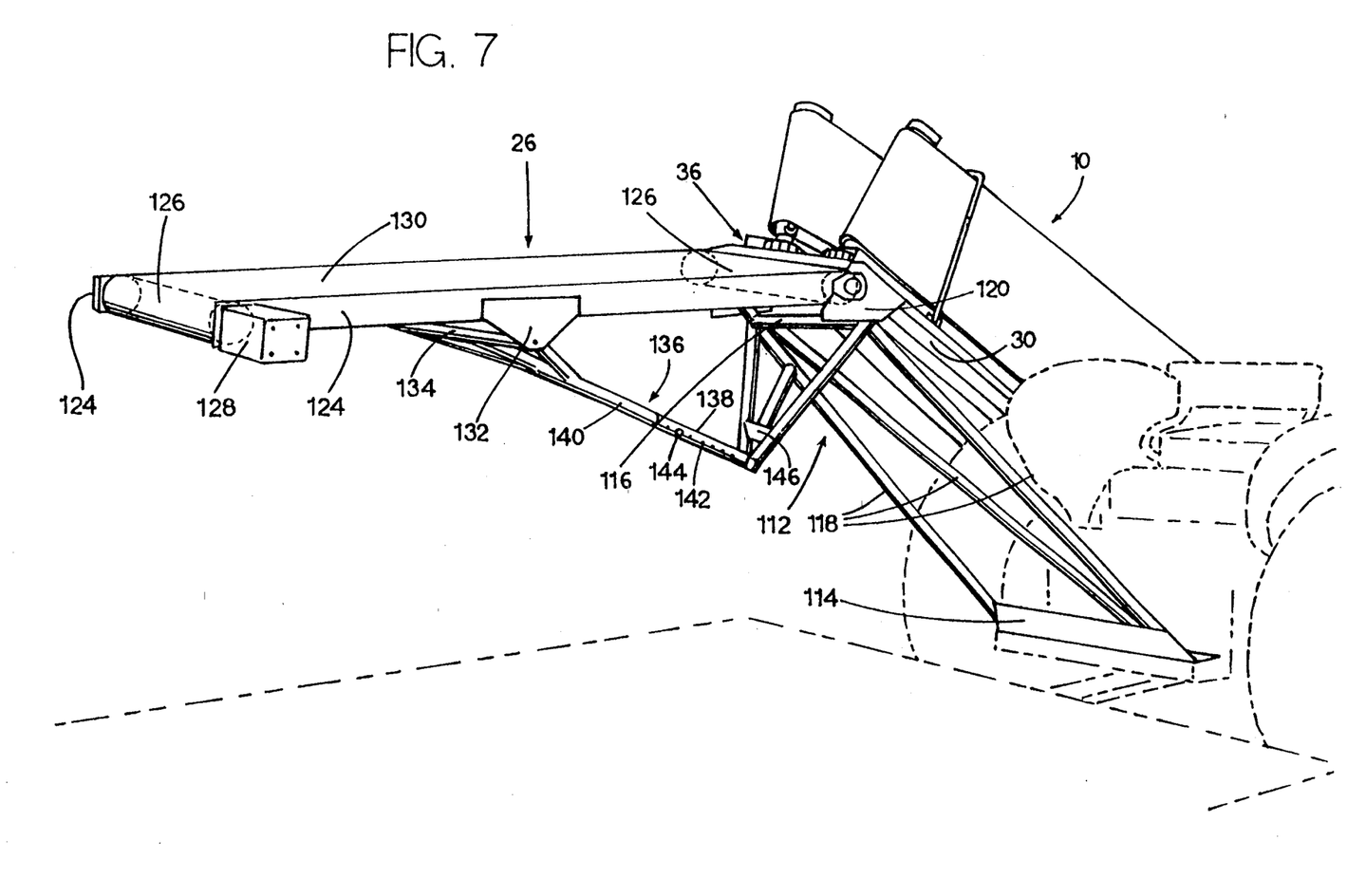
FIG. 7 is a perspective view of the horizontal conveyor and accompanying support.

The rear 36 of the frame 30 is connected to the pulling vehicle by means of a support arm 112 (FIG. 7). The support arm 112 has both a vehicle attachment plate 114 and a conveyor attachment bar 116. Connecting the vehicle attachment plate 114 to the conveyor attachment bar 116 are three support bars 118 constructed of cylindrical steel. The bars 118 are welded to both the conveyor attachment bar 116 of the support arm 112 and the vehicle attachment plate 114. The vehicle attachment plate 114 is preferably bolted to a three-point hitch extending from the pulling vehicle and the conveyor attachment bar 116 is pivotally connected to a bracket 120 bolted to the rear underside of the frame 30.

In the preferred embodiment of the present invention, a substantially horizontal conveyor 26 is pivotally connected to the bracket 120 of the frame 30 (FIG. 7). The horizontal conveyor 26 is constructed of a pair of side plates 122 and 124 housing between them a pair of rollers 126 (FIGS. 3 and 7). Drivably connected to the rear roller is a hydraulic motor 128. The horizontal conveyor 26 is provided with a canvas or rubber conveyor belt 130 similar to the lower conveyor belts 90.

Depending from the side plates 122 and 124 at about the middle of the horizontal conveyor 26 are a pair of struts 132 (FIG. 7). Pivotally connected between the struts 132 is a cross arm 134. Welded to the cross arm 134 is a two-piece adjustment arm 136 having a lower sleeve 138 and an upper cylinder 140. Both the lower sleeve 138 and the upper cylinder 140 are provided with holes 142 into which is placed a pin 144. By removing the pin 144, moving the lower sleeve 138 relative to the upper cylinder 140 and replacing the pin 144, the orientation of the conveyor 26 may be manipulated. Pivotally connected to the lower sleeve 138 is a three-beam bracket 146 welded to the conveyor attachment bar 116 as well as to one of the support bars 118. The three-beam bracket 146 supports and stabilizes the conveyor 26 during operation of the apparatus 10.

Operation of the apparatus 10 is accomplished by securing the frame lifter 62 and the support arm 112 of the apparatus 10 to a tractor (FIG. 3). The hydraulic cylinder 70 is retracted to pivot the frame 30 and place the wheels 58 in contact with the ground. The angle between the conveyor belts 90 is manipulated with the arms 102 until the angle appropriate for the desired type of tobacco 14 has been set. The adjustment chains 32 are then adjusted to orient the ends 28 of the snouts 18 the desired distance from one another for the width of the rows being harvested. The hydraulic motor 42 is placed in operation to start the circular saw 50 (FIG. 4), and the rear hydraulic motor 98 is engaged to begin the motion of the dual conveyor 22 (FIG. 8). The hydraulic motor 128 for the horizontal conveyor 26 is also engaged to start the horizontal conveyor belt 130 (FIG. 7).

The apparatus 10 is guided along a row of crops 14 by the tractor, so that the snouts 18 guide the tobacco 14 into the cutting area 20 (FIG. 1). Once the stalks 12 of the tobacco 14 have reached the cutting area 20, the circular saw 50 slices the stalks and draws them into the fingers 86 of the gathering chains 84. The fingers 86 engage the stalks 12 and move the tobacco 14 upward and rearward along the frame 30. As the gathering chains 84 move the stalks 12, the conveyor belts 90 coact to engage and move the leaves 94 upward and rearward. Because the belts 90 are only supported on the ends of the frame 30, the belts 90 have a large amount of play which acts to protect the leaves 94 and prevent the belts 90 from crushing or abrading the leaves 94.

Once the tobacco 14 has reached the rear 36 of the frame 30, the tobacco 14 exits from the conveyor 22 and is deposited on the horizontal conveyor 26 (FIG. 3). The tobacco 14 is transported along the horizontal conveyor 26 to a point where a worker may take the tobacco 14 from the conveyor 26 and either stack the tobacco 14 on a trailer or prepare the tobacco 14 for drying. When the harvesting is finished, the hydraulic cylinder 70 is activated to pivot the frame 30 and lift the wheels 58 off the ground, so that the apparatus 10 may be transported quickly (FIG. 3).

The distance between the ends of the snouts 28, the angle between the conveyor belts 90, and the speed of the conveyor 22 may all be adjusted to meet the demands of the specific type of tobacco 14 being harvested (FIG. 1). For crops such as tobacco, the angle between the conveyor belts 90 is relatively acute so that the leaves 94 of the tobacco 14 may be well supported and prevented from falling into the gathering chains 82. For tobacco 14 with large leaves 94, the speed of the conveyor 22 as well as the angle between the conveyor belts 90 may be increased. Conversely, for tobacco 14 with a relatively small leaves 94, the conveyor speed and the angle between the conveyor belts 90 may be decreased.

The foregoing description and drawings merely explain and illustrate the invention and the invention is not limited thereto, except insofar as the claims are so limited, as those skilled in the art who have the disclosure before them will be able to make modifications and variations therein without departing from the scope of the invention. For example, the apparatus 10 may be used on many types of fragile or expensive crops such as cabbage and seed corn.

What is claimed is:

1. A harvesting apparatus for row crops having stalks and produce, said apparatus being capable of cutting the stalks and conveying the row crops to a processing point without substantial damage to the produce, said harvesting apparatus comprising:
   (a) a frame having a front and a back;
   (b) a cutter operably connected near said front of said frame, said cutter capable of cutting the stalks of the row crops;
   (c) at least one guide operably connected near said front of said frame and being provided in front of said cutter, said guide being capable of directing the row crops into said cutter;
   (d) means operably connected to said frame for receiving and conveying the produce to the processing point, said produce receiving and conveying means comprising at least two conveyors running along substantially the entire length of said frame and capable of engaging two sides of the produce as the row crops are being conveyed; and
   (e) means operably connected to said frame for engaging the stalks separately from the produce and conveying the stalks to the processing point, said stalk engaging and conveying means being capable of conveying the stalks in a manner which substantially prevents contact of said stalk engaging and conveying means with the produce.

2. The harvesting apparatus of claim 1, wherein said front of said frame is lower than said rear of said frame.

3. The harvesting apparatus of claim 1, wherein said stalk engaging and conveying means are at least one gathering chain running along frame adjacent said at least two conveyors.

4. The harvesting apparatus of claim 1, further comprising means for adjusting the angle between said at least two conveyors.

5. The harvesting apparatus of claim 1, further comprising a first snout and a second snout operably connected to said frame, wherein said first snout and said second snout are adjustable in relationship to one another to accommodate various width rows of crops.

6. A harvesting apparatus for row crops having stalks and produce, said apparatus being capable of cutting the stalks and conveying the row crops to a processing point without substantial damage to the produce, said harvesting apparatus comprising:
   (a) a frame having a front and a rear, wherein said front is disposed below said rear;
   (b) a cutter operably connected to said front of said frame, said cutter capable of receiving and cutting the stalks of the row crops;
   (c) means operably connected to said front of said frame for guiding the row crops into said cutter;
   (d) at least two substantially laterally disposed conveyor belts provided along substantially the entire length of said frame, and capable of contacting at least two sides of said produce and moving said produce toward the processing point; and
   (e) means provided on said frame for engaging the stalks separately from the produce and conveying the stalks toward the processing point, said stalk engaging and conveying means being capable of conveying the stalks in a manner which substantially prevents contact of said stalk engaging and conveying means with the produce.

7. The harvesting apparatus of claim 6, further comprising means for adjusting an angle between said at least two substantially laterally disposed conveyor belts.

8. The harvesting apparatus of claim 6, wherein said guiding means are at least one snout operably connected to said front of said frame and capable of directing the row crops into said cutter.

9. The harvesting apparatus of claim 6, wherein said guiding means are a pair of snouts operably connected to said front of said frame and adjustable relative to one another to guide row crops growing in various width rows into said cutter.

10. The harvesting apparatus of claim 6, wherein said stalk engaging and conveying means are at least one gathering chain running along the frame adjacent at least two substantially laterally disposed conveyor belts.

11. A harvesting apparatus for tobacco having stalks and leaves, said apparatus being capable of cutting the stalks and conveying the leaves to a processing point, without substantial damage to the leaves, said harvesting apparatus comprising:
   (a) a frame having a front end and a rear end, wherein said front end is disposed lower than said rear end;
   (b) a cutter operably connected to said front of said frame, said cutter being capable of receiving and cutting the stalks;
   (c) means operably connected to said front of said frame for guiding the tobacco into said cutter;

(d) at least two substantially laterally disposed conveyors operably connected to said frame, and capable of receiving the leaves as the stalks leave the cutter, said at least two substantially laterally disposed conveyors further being capable of transporting the leaves from said cutter toward the processing point while maintaining the leaves substantially out of contact with said stalk receiving and conveying means;

(e) means operably connected to said frame for engaging the stalks separately from the produce and conveying the stalks to the processing point, said stalk engaging and conveying means being capable of conveying the stalks in a manner which substantially prevents contact of said stalk engaging and conveying means with the produce; and (f) means for adjusting an angle between said at least two substantially laterally disposed conveyors.

12. The harvesting apparatus of claim 11, wherein said at least two substantially laterally disposed conveyors are positioned at an acute angle relative to one another.

13. The harvesting apparatus of claim 11, wherein said means for guiding the tobacco into said cutter are a pair of snouts adjustable in relationship to one another to accommodate rows of various widths.

14. The harvesting apparatus of claim 11, further comprising at least one caster wheel operably connected to said frame.

15. The harvesting apparatus of claim 11, wherein said stalk engaging and conveying means are at least one gathering chain running along the frame adjacent said at least two substantially laterally disposed conveyors.

* * * * *